(12) United States Patent
Lee et al.

(10) Patent No.: US 11,871,157 B2
(45) Date of Patent: Jan. 9, 2024

(54) OPTICAL SENSOR DEVICE AND CALIBRATION METHOD CAPABLE OF AVOIDING FALSE MOTION ALARM

(71) Applicant: PixArt Imaging Inc., Hsin-Chu (TW)

(72) Inventors: Joon Chok Lee, Penang (MY); Kevin Len-Li Lim, Penang (MY); Wen-Han Yao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/719,364

(22) Filed: Apr. 12, 2022

(65) Prior Publication Data

US 2022/0239868 A1   Jul. 28, 2022

Related U.S. Application Data

(60) Continuation-in-part of application No. 17/010,793, filed on Sep. 2, 2020, now Pat. No. 11,336,869, which is a division of application No. 16/261,569, filed on Jan. 30, 2019, now Pat. No. 10,805,579.

(51) Int. Cl.
| | |
|---|---|
| *H04N 7/18* | (2006.01) |
| *G06T 7/246* | (2017.01) |
| *G06T 7/00* | (2017.01) |
| *G06T 7/80* | (2017.01) |
| *H04N 23/71* | (2023.01) |
| *H04N 23/73* | (2023.01) |

(52) U.S. Cl.
CPC .......... *H04N 7/188* (2013.01); *G06T 7/0002* (2013.01); *G06T 7/248* (2017.01); *G06T 7/80* (2017.01); *H04N 23/71* (2023.01); *H04N 23/73* (2023.01); *G06T 2207/30168* (2013.01); *G06T 2207/30232* (2013.01)

(58) Field of Classification Search
CPC ........ H04N 7/188; H04N 23/71; H04N 23/73; H04N 7/183; H04N 23/61; H04N 23/65; H04N 23/667; H04N 17/002; G06T 7/0002; G06T 7/248; G06T 7/80; G06T 2207/30168; G06T 2207/30232; G06T 7/254

See application file for complete search history.

(56) References Cited

U.S. PATENT DOCUMENTS

| | | | |
|---|---|---|---|
| 9,875,530 B2 * | 1/2018 | Träff | H04N 7/183 |
| 2005/0275723 A1 * | 12/2005 | Sablak | H04N 23/62 |
| | | | 348/169 |
| 2017/0205619 A1 * | 7/2017 | Hamada | H04N 23/56 |
| 2021/0407047 A1 * | 12/2021 | Goel | G06V 10/758 |

FOREIGN PATENT DOCUMENTS

CN    105744117 A    7/2016

\* cited by examiner

*Primary Examiner* — Gevell V Selby

(74) *Attorney, Agent, or Firm* — Winston Hsu

(57) ABSTRACT

A method of an optical sensor device includes: automatically entering a calibration mode to automatically define a region of interest as a masking region; and, selectively ignoring a motion detected within the masking region when the optical sensor device is in a normal operation mode.

20 Claims, 4 Drawing Sheets

Masking region's pixel threshold adjusting

Motion detection result in normal operation mode

Masking region's pixel threshold adjusting

Motion detection result in normal operation mode

Masking region's pixel threshold adjusting

Motion detection result in normal operation mode

OPTICAL SENSOR DEVICE AND CALIBRATION METHOD CAPABLE OF AVOIDING FALSE MOTION ALARM

CROSS REFERENCE TO RELATED APPLICATIONS

This application is a continuation-in-part of U.S. application Ser. No. 17/010,793, filed on Sep. 2, 2020, which is a division of U.S. application Ser. No. 16/261,569, filed on Jan. 30, 2019. The contents of these applications are incorporated herein by reference.

BACKGROUND OF THE INVENTION

1. Field of the Invention

The invention relates to an optical sensor mechanism, and more particularly to an optical sensor device and a corresponding method.

2. Description of the Prior Art

Generally speaking, a conventional optical sensor is used to capture and generate monitoring frames when it is used as a security camera. However, the conventional optical sensor may frequently generate false motion alarms due to that background motions may occur in the monitoring frames. The false motions are not considered as true motions such as foreground motions. A backend monitoring system device may be frequently exits the power saving mode (e.g. sleep mode) to perform a video recording operation upon the monitoring frames due to the false motion alarms.

SUMMARY OF THE INVENTION

Therefore one of the objectives of the invention is to provide an optical sensor device and corresponding method capable of automatically determining and then ignoring background motions to avoid generating false motion alarms, to solve the above-mentioned problems.

According to embodiments of the invention, a method of an optical sensor device is disclosed. The method comprises: entering a calibration mode to automatically define a region of interest as a masking region which comprises at least one pixel image captured by at least one pixel unit of the optical sensor device; and, selectively ignoring a motion, detected within the at least one pixel unit comprised by the masking region, on an incoming monitoring image captured by the optical sensor device in a normal operation mode.

According to the embodiments, an optical sensor device is disclosed. The optical sensor device comprises a pixel array and a processor. The pixel array has a plurality of pixel units, and a pixel unit is arranged to capture a pixel image. The processor is coupled to the pixel array, and used for generating a monitoring frame based on pixel images from the pixel array. The optical sensor device is arranged to enter a calibration mode to automatically define a region of interest as a masking region which comprises at least one pixel image captured by at least one pixel unit of the optical sensor device. In a normal operation mode, the optical sensor device selectively ignores a motion, detected within the at least one pixel unit comprised by the masking region, on an incoming monitoring image captured by the optical sensor device.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical sensor device capable of more accurately detecting true motion(s) to generate a true motion alarm report/signal into a backend monitoring system device by automatically defining and marking/updating a region of interest on multiple monitoring frames/images, wherein the pixel unit(s) within the region of interest can ignore background motion (s).

Figure 1:
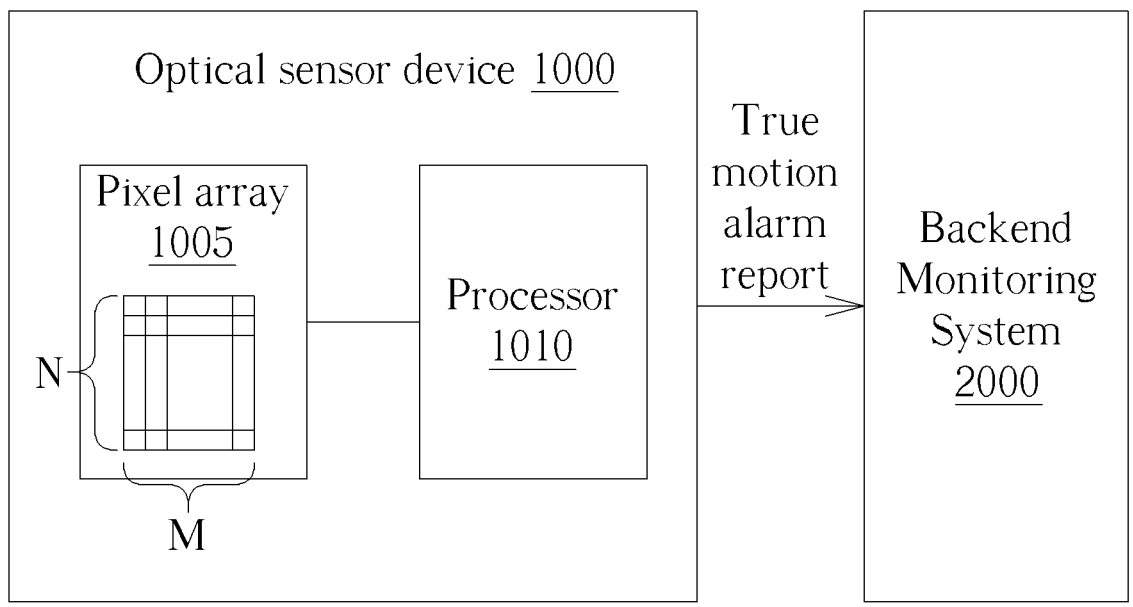
FIG. 1 is a block diagram of an optical sensor device according to an embodiment of the invention.

FIG. 1 is a block diagram of an optical sensor device 1000 according to an embodiment of the invention. The optical sensor device 1000 for example (but not limited) can be used as a motion sensor device such as a security camera which may be installed at a specific spatial location and used to monitor or detect a motion/moving object within a field of view (FOV) of the optical sensor device 1000 and to generate and output a motion alarm report/signal to a backend monitoring system device 2000 externally coupled to the optical sensor device 1000 if detecting the motion/moving object; the backend monitoring system device 2000 may be arranged to perform a video recording operation upon the images captured by and sent from the optical sensor device 1000 after it receiving the motion alarm report.

The optical sensor device 1000 can generate a true motion alarm report/signal by automatically ignoring non-true motions as far as possible, and thus the backend monitoring system device 2000 will not awakened by a false motion alarm report which is associated with a background motion event since the background motion event can be ignored by the optical sensor device 1000.

In the embodiments, a true motion for example (but not limited) is the motion of a foreground moving object such as a moving human-shape object, and it is different from the motion of a background moving object such as a rotating fan, a swaying tree and/or a TV/monitor that displays moving contents. In addition, a moving object may be considered as a background moving object if the motion of the moving object periodically occurs at a specific location or in a specific range of pixel units during a specific time period/interval.

The optical sensor device 1000 comprises a pixel array 1005 having a plurality of pixel units (pixels or sub-pixels) such as N×M pixel units shown in FIG. 1 and a processor 1010 coupled to the pixel array 1005. The optical sensor device 1000 used as the security camera is arranged to detect whether a true motion occurs, generate a true motion alarm report of the true motion to the backend monitoring system device 2000, and not generate a false motion alarm report associated with background motion(s) to the backend monitoring system device 2000, so that the backend monitoring system device 2000 can perform the video recording operation in response to only the true motion alarm report since the backend monitoring system device 2000 does not receive a false motion alarm report. Power consumption can be significant reduced.

In practice, the optical sensor device 1000 comprises a calibration mode and a normal operation mode. The optical sensor device 1000 can be arranged to automatically enter the calibration mode to automatically define or determine a spatial region/area of interest (ROI) as a masking region which comprises at least one pixel image captured by at least one pixel unit of the optical sensor device 1000, by automatically determining which pixel unit(s) is/are within the masking region, so that a portion of pixel units is/are classified within the masking region while the other pixel units are outside the masking region. A pixel unit in the masking region may be used to selectively ignore a background motion or ignore all type motions in the normal operation mode.

Then, after the masking region has been automatically defined or updated, in the normal operation mode, the optical sensor device 1000 can be arranged to ignore background motion event(s) detected by at least one pixel unit within the masking region on an incoming monitoring image/frame to avoid generating a false motion alarm associated with the background motion event(s) into the backend monitoring system device 2000.

In one embodiment, all type motions may be ignored by the masking region, and equivalently the motion detection operation may be not performed upon the pixel images within the masking region to avoid generating motion reports. That is, in the normal operation mode, when a motion within the masking region is detected, the optical sensor device 1000 does not generate a motion alarm report signal to avoid a false alarm report. In addition, it should be noted that a motion detected by a pixel unit outside the defined masking region is considered as a true motion in the embodiments.

For example (but not limited), when the optical sensor device 1000 used as a security camera is installed at a specific spatial location or is initially powered up, the optical sensor device 1000 can enter the calibration mode to automatically define the masking region for one/single time and then exits and enters the normal operation mode to monitor whether a true motion event occurs by using the defined masking region to avoid generating false motion alarm(s).

Further, in another embodiment, the operation of entering the calibration mode can be automatically triggered. For instance, when the optical sensor device 1000 operating in the normal operation mode detects that an identical/similar motion frequently occurs in only a picture range of a monitoring frame (i.e. the identical/similar motion does not occur in the other picture range, and this indicates that the identical/similar motion may be a new background motion stays with a particular region for a specific time period) during a specific time period/interval, the optical sensor device 1000 may automatically enter the calibration mode to update the masking region.

Further, the optical sensor device 1000 may periodically determine to enter the calibration mode to update the masking region. For instance, the optical sensor device 1000 may update the masking region at a particular time (e.g. a particular hour, morning, noon, afternoon, midnight, etc.) every day or every working day. That is, the optical sensor device 1000 may periodically enter the calibration mode to automatically redefine or adjust the masking region without a user's manually defining.

Further, the operation of entering the calibration mode can be manually triggered by a user.

Figure 2:
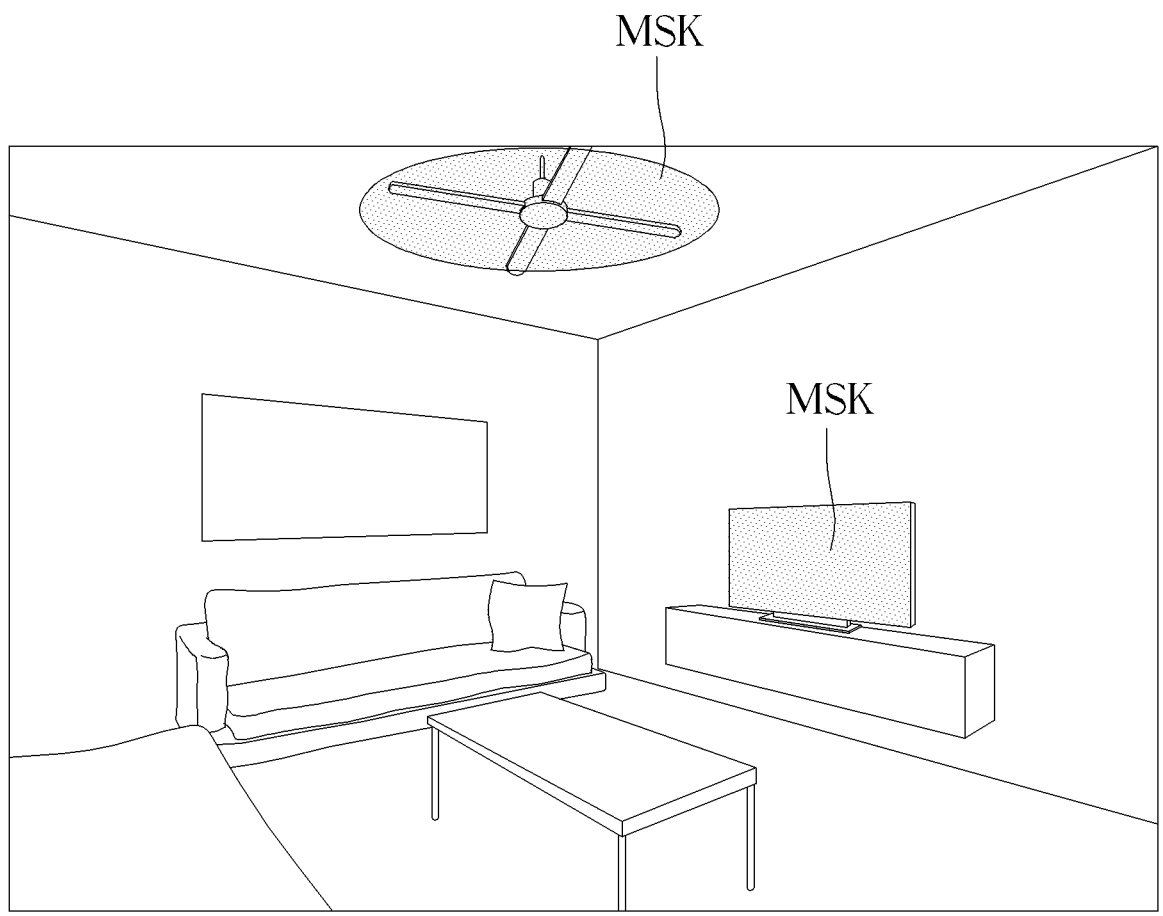
FIG. 2 is a diagram of an example of a monitoring frame captured by the optical sensor device of FIG. 1 according to an embodiment of the invention.

FIG. 2 is a diagram of an example of a monitoring frame captured by the optical sensor device 1000 of FIG. 1 according to an embodiment of the invention. In FIG. 2, the captured monitoring frame comprises for example two background moving objects such as the rotating ceiling fan and the TV monitor that display image contents. To avoid generating a false motion alarm report, the optical sensor device 1000 after being powered up may enter the calibration mode in which the optical sensor device 1000 can automatically define that the area of the frame's pixel units corresponding to the background moving objects as the masking region MSK and the other areas are not within the masking region MSK. Thus, when exiting the calibration and then entering the normal operation mode, the optical sensor device 1000 can ignore the background images (i.e. the images of the rotating fan and TV monitor's contents) in the masking region MSK. That is, the images of the rotating fan and TV monitor's contents cannot trigger a motion alarm report.

Further, in one embodiment, once the calibration operations of the calibration mode are completed (i.e. all non-true motions have been masked), an input pin or software setting can be provided for a user to allow the user manually configuring the optical sensor device 1000 into the normal operation mode.

In the embodiment, the optical sensor device 1000 employs a pixel-level mapping scheme. In practice, in the calibration mode, one or each pixel unit is arranged to capture one or more pixel images such as successive pixel images (or called as pixel-level images) and to detect or determine whether a background/undesired motion occurs in its captured pixel image(s).

A pixel image generated in the calibration mode may be called as a background pixel image for an example of the optical sensor device 1000 which is used as a security camera. In addition, a background/undesired motion is different from a true motion event such as a foreground motion. For example, a pixel unit in the calibration mode is used to determine whether a background motion occurs in the pixel unit by comparing a current pixel image (i.e. a currently captured pixel image) with a reference pixel image such as a previous pixel image or an average value (or weighted average value) of multiple/successive previous pixel images. The pixel unit in the calibration mode may determine that a background motion occurs if in this situation the pixel difference between the current pixel image and the reference pixel image is greater than a specific pixel threshold. It should be noted that pixel units may be associated with the respective pixel thresholds having identical or different pixel values, and the default values of the pixel thresholds may be identical or different.

In the embodiment, when detecting the background/undesired motion, the pixel unit in the calibration mode does not generate a motion positive signal to the processor 1010, and instead the pixel unit is arranged to adjust its specific pixel threshold from a default threshold value into a higher threshold value which is at least higher than the calculated pixel difference and is to be used in the normal operation mode so as to appropriately ignore the background/undesired motion and/or equivalently disable the motion detection of the pixel unit in the normal operation mode. It should be noted that the motion positive signal may be sent from a pixel unit to the processor 1010 in the normal operation mode if the pixel unit in normal operation mode detects a true motion, i.e. the motion positive signal in the embodiment is used to notify the processor 1010 of the pixel unit detecting the true motion.

When the optical sensor device 1000 exits the calibration mode and enters the normal operation mode, for the pixel unit, the pixel difference caused by the background motion will become not greater than the adjusted threshold value (i.e. the higher threshold value), so that the pixel unit does not generate and output a motion positive signal corresponding to the background/undesired motion, i.e. a false motion positive signal, to the processor 1010.

In this situation, the processor 1010 may use a previous monitoring pixel image as a current monitoring pixel image for the pixel unit, i.e. it is not necessary to update the pixel image for the pixel unit. In the normal operation mode, if the pixel difference at the pixel unit becomes higher than the adjusted threshold value (i.e. the higher threshold value), this indicates that the larger pixel difference at the pixel unit may be associated with a true motion event rather than the background/undesired motion, and the pixel unit is arranged to generate and output a motion positive signal corresponding to the true motion event, i.e. a true motion positive signal, to the processor 1010; in this situation, the processor 1010 updates the monitoring pixel image of the pixel unit after receiving the motion positive signal.

It should be noted that, in the normal operation mode, one or each pixel unit is also arranged to capture one or more pixel images such as successive pixel images, and it is used to detect or determine whether a true motion such as a foreground motion occurs in its captured pixel image(s).

A pixel image generated in the normal operation mode may be called as a monitoring pixel image for an example of the optical sensor device 1000 which is used as the security camera, and a frame formed by the pixel images of all the pixel units may be called as a monitoring frame. In addition, in the embodiment, the pixel units are respectively use their respective pixel thresholds (may be different or equal) to compare the pixel difference with the pixel thresholds so as to determine whether true motion(s) may occur in the pixel unit(s).

By doing so, this can effectively avoid generating false motion positive signals to the processor 1010 and avoid generating false motion alarm reports to the backend monitoring system device 2000. Power consumption of the processor 1010 and backend monitoring system device 2000 can be significantly reduced since the processor 1010 will not frequently awaked by false motion positive signals and the backend monitoring system device 2000 will not frequently awaked by the false motion alarm reports.

Figure 3:
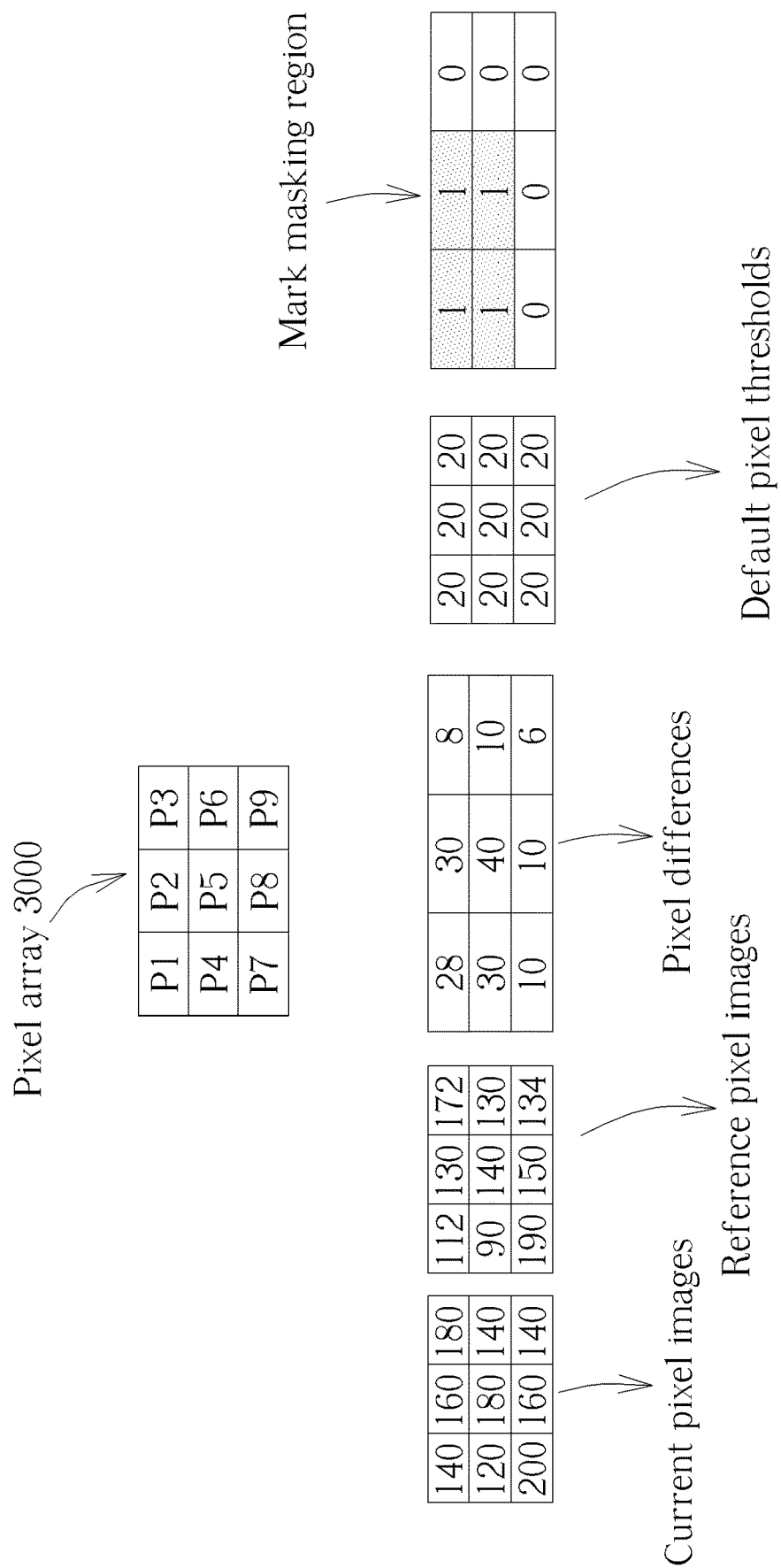
FIG. 3 is a diagram of an example of the operations of the pixel units of the optical sensor device during the calibration mode according to an embodiment of the invention.

FIG. 3 is a diagram of an example of the operations of the pixel units of the optical sensor device 1000 during the calibration mode according to an embodiment of the invention. As shown in FIG. 3, a small three-by-three pixel array 3000 having nine pixel units P1, P2, P3, P4, P5, P6, P7, P8, and P9 is provided as an example (but not limited) to illustrate the operations of the pixel units in FIG. 1, and a pixel value is configured to have the 8-bit data width, e.g. the value range of a pixel value may be from zero to 255.

In FIG. 3, when it is in the calibration mode, the pixel units P1-P9 for example capture and generate the background pixel images respectively corresponding to the pixel values {140, 160, 180, 120, 180, 140, 200, 160, 140}, and their reference pixel images are associated with the pixel values {112, 130, 172, 90, 140, 130, 190, 150, 134}. Thus, the pixel units P1-P9 calculates the pixel differences (or called as absolute pixel differences) respectively corresponding to the pixel values {28, 30, 8, 30, 40, 10, 10, 10, 6}, as shown in FIG. 3. In addition, the pixel thresholds of the pixel units P1-P9 are equal to the pixel value 20 in a default setting. Thus, the pixel differences of the pixel units P1, P2, P4, and P5 are greater or higher than the pixel thresholds, e.g. the pixel value 20, and the pixel differences of the other pixel units P3, P6, and P7-P9 are smaller or lower than the pixel thresholds.

In this situation, the pixel units P1, P2, P4, and P5 are classified into the masking region, and the other pixel units P3, P6, and P7-P9 are excluded by the masking region. For example, a pixel unit classified in to the masking region is marked with bit '1', and a pixel unit not in the masking region is marked with bit '0', as shown in FIG. 3.

In one embodiment, after defining or determining the masking region, the pixel unit(s) in the masking region is/are arranged to adjust their pixel thresholds from a current pixel threshold (e.g. a default pixel threshold) into a higher pixel threshold such as a maximum pixel value of the pixel range of the 8-bit data width (but not limited) to mask off motion detection.

Figure 4:
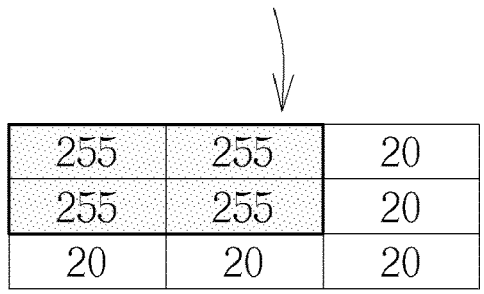
FIG. 4 is a diagram of an example of the operations of the pixel units of the optical sensor device updating the pixel thresholds of a portion of pixel units according to an embodiment of the invention.
Figure 4:
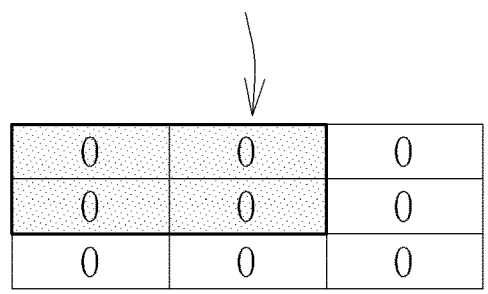

FIG. 4 is a diagram of an example of the operations of the pixel units of the optical sensor device 1000 updating the pixel thresholds of a portion of pixel units according to an embodiment of the invention. As shown in FIG. 4, the processor 1010 or the pixel units may configure the pixel thresholds of the pixel units within the masking region as a maximum pixel value of the 8-bit data, i.e. the maximum pixel value 255. Thus, as shown in FIG. 4, when it is in the normal operation mode, the pixel units P1-P9 may still capture and generate the monitoring pixel images respectively corresponding to the pixel values {140, 160, 180, 120, 180, 140, 200, 160, 140}, and their reference pixel images may be still associated with the pixel values {112, 130, 172, 90, 140, 130, 190, 150, 134}. The pixel units P1-P9 calculates the pixel differences (or called as absolute pixel differences) respectively corresponding to the pixel values {28, 30, 8, 30, 40, 10, 10, 10, 6}.

In this situation, the pixel thresholds of the pixel units P1, P2, P4, and P5 are adjusted and are equal to the maximum pixel value 255, and the pixel thresholds of the other pixel units P3, P6, and P7-P9 are equal to the default pixel threshold, i.e. 20. Accordingly, the pixel differences of the pixel units P1, P2, P4, and P5 become not greater (or not higher) than the pixel thresholds (e.g. the maximum pixel value), and the pixel units P1, P2, P4, and P5 in the masking region do not generate motion positive signals to the processor 1010 since in this embodiment it is impossible for the pixel differences of the pixel units in the masking region to be greater or higher than their respective maximum pixel thresholds. Equivalently, selecting the maximum pixel value as the pixel thresholds for the pixel units in the masking region is used to completely disable the motion detection for the masking region. In addition, the bits '0' of the motion detection results in the normal operation mode are used to indicate that no motions are detected by the corresponding pixel units P1-P9 in this example. The background/undesired motions in the pixel units P1, P2, P4, and P5 are ignored or filtered out equivalently.

In another embodiment, after defining or determining the masking region, the pixel unit(s) in the masking region is/are arranged to adjust their pixel thresholds from a current pixel threshold (e.g. a default pixel threshold) into a higher pixel threshold such as the correspondingly calculated pixel difference(s) (but not limited) to adjust or reduce the sensitivity level of motion detection.

Figure 5:
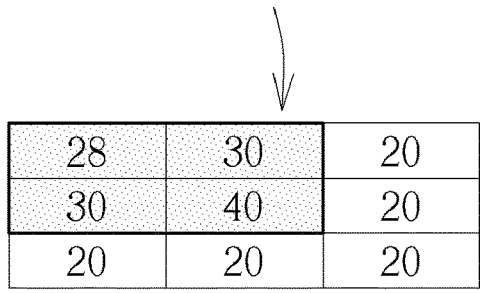
FIG. 5 is a diagram of an example of the operations of the pixel units of the optical sensor device updating the pixel thresholds of a portion of pixel units according to another embodiment of the invention.
Figure 5:
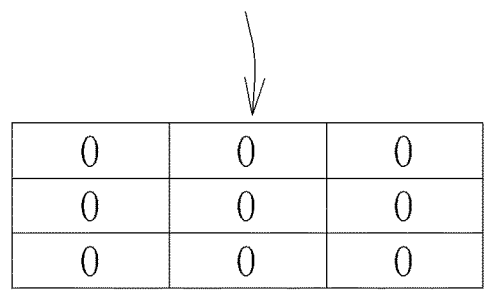

FIG. 5 is a diagram of an example of the operations of the pixel units of the optical sensor device 1000 updating the pixel thresholds of a portion of pixel units according to another embodiment of the invention. As shown in FIG. 5, the processor 1010 or the pixel units may configure the pixel thresholds of the pixel units within the masking region as the correspondingly calculated pixel differences. For example, the pixel thresholds of the pixel units P1, P2, P4, and P5 within the masking region are configured as the calculated pixel differences {28, 30, 30, 40} which are calculated in the calibration mode. When the optical sensor device 1000 enters the normal operation mode, the pixel units P1-P9 may still capture and generate the monitoring pixel images respectively corresponding to the pixel values {140, 160, 180, 120, 180, 140, 200, 160, 140}, and their reference pixel images may be still associated with the pixel values {112, 130, 172, 90, 140, 130, 190, 150, 134}. The pixel units P1-P9 calculates the pixel differences (or called as absolute pixel differences) respectively corresponding to the pixel values {28, 30, 8, 30, 40, 10, 10, 10, 6}.

In this situation, the pixel thresholds of the pixel units P1, P2, P4, and P5 are configured and updated as the pixel differences calculated in the calibration mode, i.e. {28, 30, 30, 40}, and the pixel thresholds of the other pixel units P3, P6, and P7-P9 are not updated and equal to the default pixel threshold, i.e. 20. Thus, in this example, the pixel differences of the pixel units P1, P2, P4, and P5 are merely equal to their pixel thresholds (i.e. the pixel values {28, 30, 30, 40}) and are not greater/higher than their pixel thresholds, and thus the pixel units P1, P2, P4, and P5 in the masking region do not generate the motion positive signals to the processor 1010 even though the background motions occur in the pixel units P1, P2, P4, and P5. A minimum pixel threshold that is sufficient to prevent false motions is at least equal to the previously calculated pixel difference. Similarly, the bits '0' of the motion detection results in the normal operation mode are used to indicate that no motions are detected by the corresponding pixel units P1-P9 in this example. The background/undesired motions in the pixel units P1, P2, P4, and P5 are ignored or filtered out equivalently. In addition, it should be noted that the pixel units P1, P2, P4, and P5 can still detect a true motion event if the true motion event is associated with the pixel values which make the pixel differences be greater/higher than their updated pixel thresholds, i.e. the pixel values {28, 30, 30, 40}. In this example, the motion detection for the masking region is not disabled.

In another embodiment, after defining or determining the masking region, the pixel unit(s) in the masking region is/are arranged to adjust their pixel thresholds from a current pixel threshold (e.g. a default pixel threshold) into a higher pixel threshold such as the results of the corresponding pixel difference(s) plus a step size (i.e. an offset pixel value) to adjust or reduce the sensitivity level of motion detection. The offset pixel value is used to provide a tolerable pixel range so as to avoid image noises.

Figure 6:
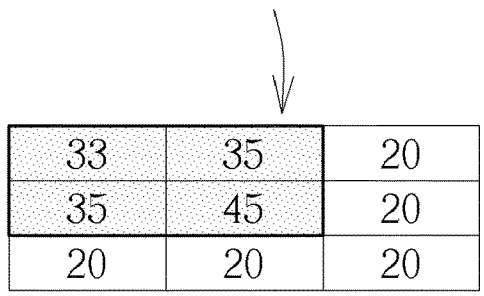
FIG. 6 is a diagram of an example of the operations of the pixel units of the optical sensor device updating the pixel thresholds of a portion of pixel units according to another embodiment of the invention.
Figure 6:
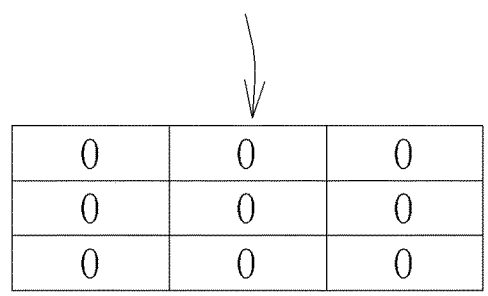

FIG. 6 is a diagram of an example of the operations of the pixel units of the optical sensor device 1000 updating the pixel thresholds of a portion of pixel units according to another embodiment of the invention. As shown in FIG. 6, the processor 1010 or the pixel units may configure the pixel thresholds of the pixel units within the masking region as the results of the calculated pixel differences plus the offset pixel value such as a pixel value 5 (but not limited). In addition, the offset pixel value may be fixed, variable, or may be dynamically configured by a user. For example, the pixel thresholds of the pixel units P1, P2, P4, and P5 within the masking region are configured as the results, e.g. {33, 35, 35, 45} of the calculated pixel differences {28, 30, 30, 40}, which are calculated in the calibration mode, plus the offset pixel value 5.

When the optical sensor device 1000 enters the normal operation mode, the pixel units P1-P9 may still capture and generate the monitoring pixel images respectively corresponding to the pixel values {140, 160, 180, 120, 180, 140, 200, 160, 140}, and their reference pixel images may be still associated with the pixel values {112, 130, 172, 90, 140, 130, 190, 150, 134}. The pixel units P1-P9 calculates the pixel differences (or called as absolute pixel differences) respectively corresponding to the pixel values {28, 30, 8, 30, 40, 10, 10, 10, 6}. In this situation, the pixel thresholds of the pixel units P1, P2, P4, and P5 now are configured and equal to the results calculated in the calibration mode, i.e. {33, 35, 35, and 45} as respectively shown in FIG. 6, and the pixel thresholds of the other pixel units P3, P6, and P7-P9 are not updated and equal to the default pixel threshold, i.e. 20.

Thus, in this example, the pixel differences of the pixel units P1, P2, P4, and P5 are smaller/lower than their pixel thresholds {33, 35, 35, 45}, and the pixel units P1, P2, P4, and P5 in the masking region do not generate the motion positive signals to the processor 1010 even though the background motions occur in the pixel units P1, P2, P4, and P5. Similarly, the bits '0' of the motion detection results in the normal operation mode are used to indicate that no motions are detected by the corresponding pixel units P1-P9 in this example. The background/undesired motions in the pixel units P1, P2, P4, and P5 are ignored or filtered out equivalently. In addition, it should be noted that the pixel units P1, P2, P4, and P5 can still detect a true motion event if the true motion event is associated with the pixel values which make the pixel differences be greater/higher than their updated pixel thresholds {33, 35, 35, 45}. In this example, the motion detection for the masking region is not disabled.

It should be noted that the advantage of reducing the sensitivity level without completely disabling the motion detection for the masking region is that a true motion can still be detected by the masking region. For example, a person may walk in front of the rotating fan in FIG. 2, and such true motion of the person can still be detected as long as the pixel difference is greater/higher than the updated pixel threshold.

Alternatively, in other embodiments, the respective values of pixel thresholds of the pixel units mentioned above can be adjusted by the processor 1010. That is, whether it in the calibration mode or normal operation mode, one or each pixel units is arranged to generate and output the currently captured pixel image to the processor 1010. The processor 1010 in the calibration mode is arranged to adjust and update the respective pixel thresholds based on the above-mentioned operations, and it in the normal operation mode is arranged to generate a true motion alarm report/signal to the backend monitoring system device 2000 if detecting a true motion based on the updated pixel thresholds. The corresponding operations are similar and are not detailed for brevity.

Since the masking region is defined automatically during calibration mode, it is not required for a user to further use an external processing device in defining the masking region. A user can always enable the calibration mode whenever new background objects are added to the optical sensor device's 100 FOV. When existing background objects are removed from the optical sensor device's 100 FOV, the user can also enable the calibration mode to update the masking region.

Further, in one embodiment, in FIG. 1, the pixel array 1005 may support a high-definition resolution such as 4K display with 3840×2160 pixel resolution (but not limited). When the optical sensor device 1000 enters the calibration mode, the optical sensor device 1000 may select merely a portion of pixel units rather than all the pixel units and adjust the corresponding pixel thresholds of the selected pixel units. The optical sensor device 1000 (or processor 1010) may automatically determining the masking region in response to an event that a specific portion of pixels within a specific region is determined to be associated with motions in the calibration mode wherein the specific portion of pixels is averagely selected from partial pixels in the specific region. For example (but not limited), for every N1 pixel units in the pixel array 1005, only a pixel unit is selected in the calibration mode to adjust the corresponding pixel threshold, and the other pixel units are not selected; the value of N1 for example is equal to 4 (but not limited). This can effectively reduce the computation amounts if the number of pixel units in the pixel array 1005 is too large.

Alternatively, in another embodiment, the greater data width (e.g. 8-bit data width) of each pixel unit may be decreased down to a smaller data width such as 3-bit data width (but not limited) so as to reduce the computation amounts. For example, pixel values of the pixel units within the masking region can be converted from a high bit number into a low bit number to decrease a computation amount of motion detection before a true motion event occurs. This also improves the processing speed of the motion detection.

It should be noted the above-mentioned optical sensor device 1000 can be a monochrome motion detection device, a motion detection device which generates only one color such as red, green, or blue, or can be a motion detection device which generates colorful images. In the examples, the above-mentioned operations of the calibration mode may be respectively applied into different color channels of the optical sensor device 1000. The optical sensor device 1000 may enter the calibration mode to automatically define the masking region on the multiple monitoring images for at least one color channel of the optical sensor device 1000.

In one embodiment, for a pixel unit, the optical sensor device 1000 may be configured to determine a color and a color scale of the captured pixel image captured by the pixel unit. For example (but not limited), for three different color channels, the optical sensor device 1000 may generate three different pixel images based on the captured colorful pixel image of a pixel unit, calculate corresponding pixel differences, and update three corresponding pixel threshold for the different color channels if needed. The corresponding operations are similar to the above-mentioned operation and are not detailed for brevity.

Further, the optical sensor device 1000 can be arranged to automatically enter the calibration mode to automatically define the masking region on the multiple monitoring images captured by the optical sensor device 1000 without receiving a trigger signal sent from another auxiliary sensor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an optical sensor device, comprising:
entering a calibration mode to automatically define a region of interest as a masking region which comprises at least one pixel image captured by at least one pixel unit of the optical sensor device; and
selectively ignoring a motion, detected within the at least one pixel unit comprised by the masking region, on an incoming monitoring image captured by the optical sensor device in a normal operation mode;
wherein a specific pixel unit is automatically determined as one pixel unit comprised by the masking region and is associated with a background motion when in the calibration mode a pixel difference between the specific pixel unit's pixel image and a reference pixel image is greater than a specific pixel threshold.

2. The method of claim 1, further comprising:
when in the normal operation mode the motion within the masking region is detected, not generating a motion alarm report signal to avoid a false alarm report.

3. The method of claim 1, further comprising:
entering the calibration mode to automatically define the masking region for one time when the optical sensor device is installed at a specific spatial location.

4. The method of claim 1, further comprising:
periodically entering the calibration mode to automatically redefine or adjust the masking region without a user's manually defining.

5. The method of claim 1, further comprising:
automatically entering the calibration mode to automatically redefine or adjust the masking region when at least one motion, detected within a particular region, stays within the particular region for a specific time period.

6. The method of claim 1, further comprising:
automatically determining the masking region in response to an event that a specific portion of pixel units within a specific region is determined to be associated with motions in the calibration mode;
wherein the specific portion of pixel units is averagely selected from partial pixel units in the specific region.

7. The method of claim 1, further comprising:
automatically determining the masking region in response to an event that pixel units within the masking region is determined to be associated with motions;
wherein pixel values of the pixel units within the masking region are converted from a high bit number into a low bit number to decrease a computation amount of motion detection before the event occurs.

8. The method of claim 1, further comprising:
entering the calibration mode to automatically define the masking region on the multiple monitoring images for at least one color channel of the optical sensor device.

9. The method of claim 1, further comprising:
entering the calibration mode to automatically define the masking region on the multiple monitoring images captured by the optical sensor device without receiving a trigger signal sent from another auxiliary sensor.

10. The method of claim 1, wherein the ignoring step comprises:

increasing pixel thresholds respectively for pixel units in the masking region into a maximum pixel value, pixel differences between current pixel images and reference pixel images of the pixel units, or results of a specific offset pixel value plus the pixel differences of the pixel units;

wherein an increased pixel threshold is compared to a corresponding pixel difference between an incoming pixel image and the reference pixel image to determine whether a corresponding pixel unit is associated with a true motion.

11. An optical sensor device, comprising:

a pixel array having a plurality of pixel units, a pixel unit being arranged to capture a pixel image; and a processor, coupled to the pixel array, for generating a monitoring frame based on pixel images from the pixel array;

wherein the optical sensor device is arranged to enter a calibration mode to automatically define a region of interest as a masking region which comprises at least one pixel image captured by at least one pixel unit of the optical sensor device; and, in a normal operation mode, the optical sensor device selectively ignores a motion, detected within the at least one pixel unit comprised by the masking region, on an incoming monitoring image captured by the optical sensor device; a specific pixel unit is automatically determined as one pixel unit comprised by the masking region and is associated with a background motion when in the calibration mode a pixel difference between the specific pixel unit's pixel image and a reference pixel image is greater than a specific pixel threshold.

12. The optical sensor device of claim 11, wherein when in the normal operation mode the motion within the masking region is detected, the optical sensor device does not generate a motion alarm report signal to avoid a false alarm report.

13. The optical sensor device of claim 11, wherein the optical sensor device enters the calibration mode to automatically define the masking region for one time when the optical sensor device is installed at a specific spatial location.

14. The optical sensor device of claim 11, wherein the optical sensor device periodically enters the calibration mode to automatically redefine or adjust the masking region without a user's manually defining.

15. The optical sensor device of claim 11, wherein the optical sensor device automatically enters the calibration mode to automatically redefine or adjust the masking region when at least one motion, detected within a particular region, stays within the particular region for a specific time period.

16. The optical sensor device of claim 11, wherein the optical sensor device automatically determines the masking region in response to an event that a specific portion of pixel units within a specific region is determined to be associated with motions in the calibration mode, wherein the specific portion of pixel units is averagely selected from partial pixel units in the specific region.

17. The optical sensor device of claim 11, wherein the optical sensor device automatically determines the masking region in response to an event that pixel units within the masking region is determined to be associated with motions; and, pixel values of the pixel units within the masking region are converted from a high bit number into a low bit number to decrease a computation amount of motion detection before the event occurs.

18. The optical sensor device of claim 11, wherein the optical sensor device enters the calibration mode to automatically define the masking region on the multiple monitoring images for at least one color channel of the optical sensor device.

19. The optical sensor device of claim 11, wherein the optical sensor device enters the calibration mode to automatically define the masking region on the multiple monitoring images captured by the optical sensor device without receiving a trigger signal sent from another auxiliary sensor.

20. The optical sensor device of claim 11, wherein pixel thresholds respectively for pixel units in the masking region are increased into a maximum pixel value, pixel differences between current pixel images and reference pixel images of the pixel units, or results of a specific offset pixel value plus the pixel differences of the pixel units; and, an increased pixel threshold is compared to a corresponding pixel difference between an incoming pixel image and the reference pixel image to determine whether a corresponding pixel unit is associated with a true motion.

* * * * *